C. H. KRAKAU.
UNCOUPLING MECHANISM.
APPLICATION FILED FEB. 12, 1921.
1,390,298.                                                      Patented Sept. 13, 1921.
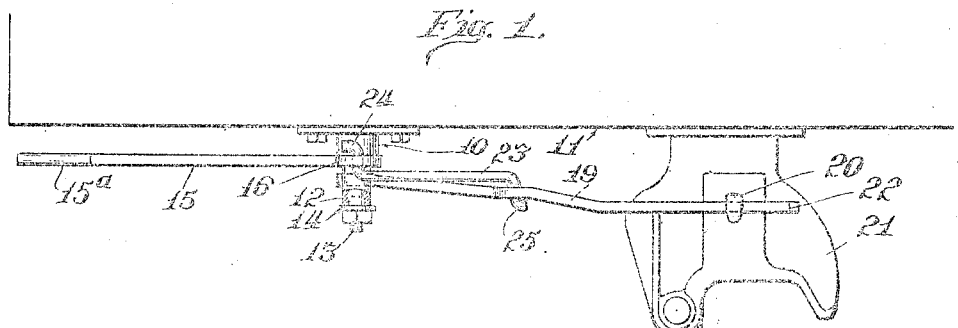
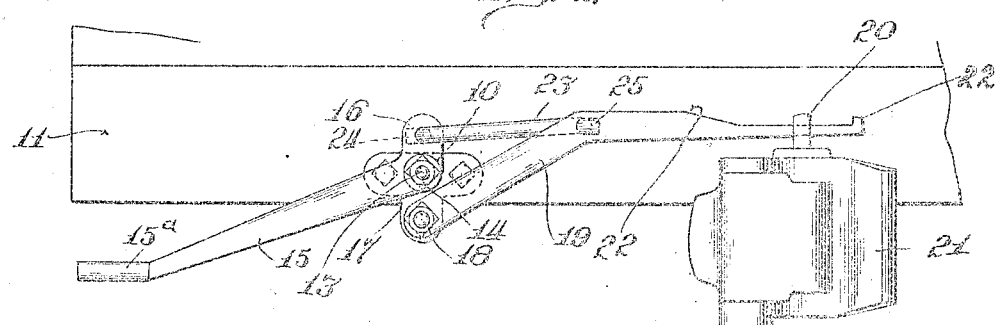
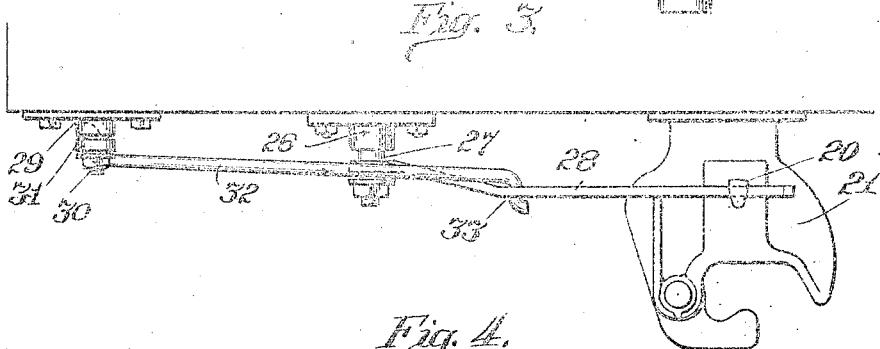
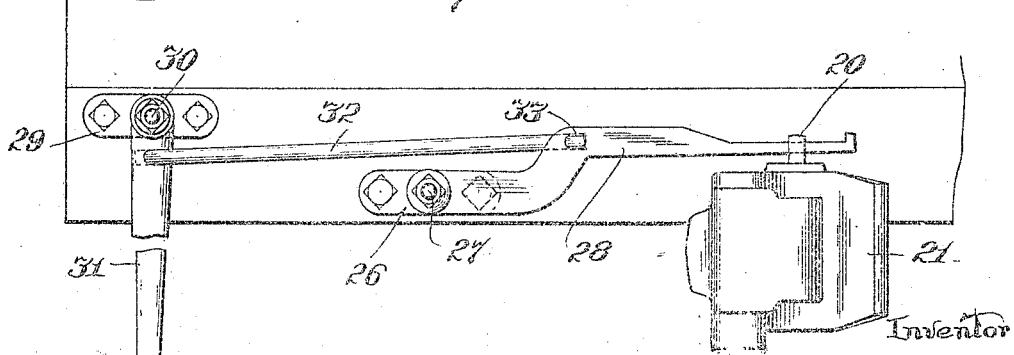

UNITED STATES PATENT OFFICE.

CLARENCE H. KRAKAU, OF CHICAGO, ILLINOIS.

UNCOUPLING MECHANISM.

1,390,298.  Specification of Letters Patent.  Patented Sept. 13, 1921.

Application filed February 12, 1921. Serial No. 444,352.

*To all whom it may concern:*

Be it known that I, CLARENCE H. KRAKAU, a citizen of the United States, and a resident of Chicago, in the county of Cook and State of Illinois, have invented certain new and useful Improvements in Uncoupling Mechanism, of which the following is a description, reference being had to the accompanying drawing, which forms a part of my specification.

My invention relates to mechanism for uncoupling car couplers and has for its object the provision of a construction employing a pair of levers so arranged and operatively connected that operation or manipulation of the lock lifter of the coupler may be easily and readily performed by the trainmen from the side of the car without necessitating going between the coupled cars; the invention also having for its object the provision of a construction whereby adequate leverage or sufficient power may be obtained and the uncoupling operation thereby made comparatively easy; while at the same time providing a construction which will not improperly affect the coupler through any undue vibration or breakage in the mechanism.

A further object of my invention is to provide uncoupling mechanism which is simple in construction and easy in operation, as will be readily comprehended from the detailed description of the accompanying drawing, wherein:—

Figure 1 is a plan view of my improved mechanism shown applied to a car end-sill and car coupler.

Fig. 2 illustrates my improved mechanism in elevation as applied in Fig. 1.

Fig. 3 is a plan view of a modified form of my improved mechanism, shown applied to a car end-sill and to a car coupler.

Fig. 4 illustrates the construction shown in Fig. 3 in elevation.

In the particular exemplification of the invention as disclosed in Figs. 1 and 2, it comprises a suitable bracket 10 adapted to be secured in any suitable manner to the car end-sill which is indicated at 11. The bracket is provided with a horizontally disposed trunnion or spindle portion 12, the outer end whereof is preferably reduced and threaded as indicated at 13 to receive a suitable washer and nut indicated at 14, see Fig. 1. The trunnion or spindle portion 12 of the bracket member 10 is intended to provide a fulcrum point for an operating lever 15 disposed transversely of the end of the car toward one side so as to be accessible from the side of the car. The operating lever 15 is preferably formed so as to slope downwardly, when in normal position, in order that the free or hand-grasping end may be disposed in a plane slightly beneath that of the end-sill, as shown at 15ª; while the inner or pivoted end of the operating lever 15 is provided with an angular portion or arm 16, disposed upwardly from the inner or fulcrumed end thereof, that is to say, the operating lever 15 is substantially in the nature of a bell-crank lever, as more clearly shown in Fig. 2.

The bracket member 10 is also provided with a downwardly disposed arm 17 and this arm is preferably provided with a trunnion or spindle 18 to provide a fulcrum point for a second lever 19; while the outer end of the spindle 18 may be threaded to receive a suitable nut and washer to maintain the lever 19 in place. The lever 19 is preferably of the angular formation more clearly shown in Fig. 2, that is the pivoted end slopes upwardly and terminates in a horizontally extending portion whereby the free or outer end of lever 19 will be disposed substantially in the same horizontal plane as the coupler lock lifter 20 of the coupler indicated at 21.

The outer or free end of the horizontal portion of the lever 19, is preferably somewhat reduced to provide the spaced shoulders 22, 22 whereby the relation of the lever to the lock lifter 20 will be maintained while at the same time providing a sliding relation between the lever and lock lifter; the reduced portion, as clearly shown in Fig. 2, being disposed through the lock lifter, while the reduced portion is of such length that sufficient play will be permitted during the operation of the mechanism.

The upstanding lug or arm 16 of operating lever 15, as well as the lifting lever 19, are both apertured to receive the opposite ends of a connecting member or link 23; the ends of the link, as disclosed in the drawing, being bent at right angles to the main portion, or substantially so, and disposed in opposite directions as shown in Fig. 1 at 24 and 25, respectively; the immediate ends of the bent portions of the link being in turn preferably bent in directions parallel with the main portion of the link so as to prevent the accidental withdrawal of the link. The connections between the levers and the link are such, however, as to permit sufficient play therebetween and prevent binding of the various elements of the mechanism.

The downwardly disposed arm 17 of the bracket member 10, and the pivotal connection therewith of lever 19, is such that no frictional contact between the ends of the two levers 15 and 19 will be encountered during the oscillatory movements of said levers; that is to say, the pivotal point 18 for the lever 19 is so disposed that lever 19 may be raised a sufficient extent to lift the lock lifter 20 into releasing position when downward pressure on the free end 15ª of operating lever 15 by the trainmen has been applied.

The mechanism is shown in normal or coupling position in the drawing and the arrangement of the levers and link is such that the weight of the mechanism will not involuntarily effect uncoupling action of the coupler lock lifter; the elements being so arranged, however, that comparatively slight pressure by the trainmen in a downward direction on the free end 15ª of lever 15 will cause a pulling action to be exerted on link or member 22, through the medium of the upstanding arm 16 of lever 15 and by reason of the connection of link 22 with lever 19 at a point considerably above and beyond the pivotal point of said lever 19, will cause the free end of lever 19 to be lifted and thereby actuated and bring the coupler lock lifter into uncoupling position. The arrangement shown and described gives the operator double or increased leverage over that obtained by devices of this nature as at present employed; thus making the operation of the uncoupling mechanism very much simpler and positive.

In Figs. 3 and 4, I show a modified form of my uncoupling mechanism, wherein a bracket 26, is secured to the end-sill of a car at a point intermediate of the coupler 21 and the end of the sill as shown. The bracket 26 is provided with a single extension or spindle 27 on which is pivotally mounted a lock lifter controlling lever 28, which is shown somewhat bayonet shape, that is to say, the lever is preferably bent at a point intermediate of its ends so as to provide a horizontally disposed portion or end adapted to extend in a horizontal plane above the coupler indicated at 21; with the outer end reduced and shouldered similar to lever 19 shown in Figs. 1 and 2.

At a point adjacent to the end of the end-sill I provide a second bracket 29 which is formed with a spindle or trunnion 30 on which is pivotally mounted a hand lever 31; the lever 31 being mounted to normally depend from the bracket as shown in Fig. 4.

Preferably at a point adjacent to the pivotal point of lever 31 is a link or rod 32 pivotally secured thereto and with the opposite end pivotally secured to lever 28 at the point 33, namely at the point where the upwardly bent portion of lever 28 terminates in the horizontally disposed lock lifter engaging portion, so that the link 32 is normally disposed in substantially the same plane as the upper end of lever 28; the ends of link 32 being shown bent in an angular manner and disposed through suitable apertures in lever 28 and lever 31, respectively, in a manner similar in that respect to the construction of link 23 of the construction shown in Figs. 1 and 2. It is evident from the construction shown that a pull exerted on the lower end of lever 31 toward the end of the end-sill adjacent thereto will produce a pull on the link 32 and thereby lift lever 28, causing it to swing about its pivotal point 27, so as to actuate the coupler lock lifter shown at 20, the same as in the previously described construction.

With both constructions, actuation of the coupler lock lifter 20 is made possible from the side of the car adjacent the end thereof and said operation is easily accomplished because of the great lifting force obtained thereby; my improved constructions giving greatly increased leverage and lifting force over that obtained by uncoupling rods as at present employed, in which the force or leverage has been found insufficient to completely throw the coupler-knuckle open.

I have shown and described what I believe to be the simplest adaption of my invention and the terms and expressions employed are merely used as terms of description and not of limitation; there being no intention in the use of such terms and expressions of excluding any mechanical equivalents for the various features shown and described, as structural modifications are possible and may be made without departing from the spirit of the invention.

What I claim is:—

1. Uncoupling mechanism comprising, in combination with the lock lifter or pin of a coupler, a lock lifter or pin controlling member pivotally mounted at one end on a car end-sill while the other end has a loose operative relation with the lock-lifter or coupler pin, an operating member pivotally mounted intermediate of its ends on the car end-sill, and means pivotally secured at one end to said last mentioned member and at the other end to said first mentioned member whereby downward movement of the last mentioned member will cause a pulling action on said means and thereby move the first member upwardly about its pivot.

2. Uncoupling mechanism of the character described, comprising a bell-crank lever pivotally mounted on the car-sill, a second lever mounted at one end on the car-sill while the other end is arranged in a different horizontal plane and adapted to control the lock lifter or pin of a coupler, and a connecting member secured to one end of the bell-crank lever and to an intermediate point on said second mentioned lever whereby oscillation of the bell-crank lever will cause said connecting member to pull the second mentioned lever upwardly.

3. Uncoupling mechanism of the character described, comprising, in combination with a coupler pin or lock lifter, a bracket adapted to be secured to the car end-sill, a bell-crank lever pivoted on said bracket, one end of said bell-crank lever being extended and disposed downwardly into a plane beneath the plane of the end-sill to constitute the hand lever while the other end of said bell-crank lever is disposed upwardly from said pivotal point, a second lever pivoted at one end on said bracket, at a point beneath the plane of the pivotal point of said bell-crank lever, and disposed upwardly therefrom, with the free end terminating in a horizontally disposed portion extending across the coupler in operative relation with the coupler pin or lock lifter, and a connecting rod or link pivotally secured to the upwardly disposed end of said bell-crank lever and to said second mentioned lever at an intermediate point.

4. Uncoupling mechanism of the character described, comprising a lever pivoted on a car end-sill and disposed downwardly beneath the end-sill, said lever being provided with an arm disposed upwardly above the plane of the pivotal point of the lever, a second lever pivoted on the end-sill in a different horizontal plane from that of the first lever, with the free end of said second lever disposed above the coupler and arranged in yielding operative relation with the lock-pin of the coupler, and a connecting element connected with said arm of the first lever and with said second lever, intermediate of its ends, so as to exert an upward pull on the second lever when the first lever is oscillated about its pivotal point.

CLARENCE H. KRAKAU.

Witnesses:
 CHESTER E. SINCLAIR,
 I. R. KINZLY.